US005499770A

United States Patent [19]
McCullough

[11] Patent Number: 5,499,770
[45] Date of Patent: Mar. 19, 1996

[54] APPARATUS FOR SUSPENSION OF PARTICLES IN AN ULTRASONIC FIELD

[75] Inventor: Edward D. McCullough, Riverside, Calif.

[73] Assignee: Rockwell International Corp., Seal Beach, Calif.

[21] Appl. No.: 300,778

[22] Filed: Sep. 6, 1994

[51] Int. Cl.⁶ .................................................. B02C 19/00
[52] U.S. Cl. .................................. 241/1; 241/40; 210/748
[58] Field of Search .................................. 209/155, 210, 209/724, 725, 730; 241/1, 40; 210/512.1, 748, 787, 788

[56] References Cited

U.S. PATENT DOCUMENTS

| | | | |
|---|---|---|---|
| 2,829,771 | 4/1958 | Dahlstrom | 209/730 |
| 3,255,999 | 6/1966 | Weston | 259/2 |
| 3,291,640 | 12/1966 | Livingston | 134/1 |
| 3,525,606 | 7/1970 | Bodine | 75/101 |
| 3,731,877 | 5/1973 | Nebrasov et al. | 239/102 |
| 4,168,295 | 9/1979 | Sawyer | 422/111 |
| 4,216,095 | 8/1980 | Ruff | 209/724 X |
| 4,498,819 | 2/1985 | El-Saie | 406/181 |
| 4,529,506 | 7/1985 | Smit | 209/13 |
| 4,566,800 | 1/1986 | Bodine | 366/118 |
| 4,652,309 | 3/1987 | Bodine | 75/101 |
| 4,763,677 | 8/1988 | Miller | 134/105 |
| 4,779,806 | 10/1988 | Langer et al. | 241/1 |
| 4,780,138 | 10/1988 | Bodine | 75/101 |
| 4,879,011 | 11/1989 | Schram | 204/157.62 |
| 4,894,134 | 1/1990 | Birken et al. | 204/193 |
| 5,035,363 | 7/1991 | Somoza | 241/1 |
| 5,059,309 | 10/1991 | Jordan | 209/164 |
| 5,192,423 | 3/1993 | Duczmal et al. | 209/725 X |
| 5,266,215 | 11/1993 | Engelhard | 210/748 |

*Primary Examiner*—William E. Terrell
*Assistant Examiner*—Tuan Nguyen
*Attorney, Agent, or Firm*—Lawrence N. Ginsberg; Charles T. Silberberg

[57] ABSTRACT

The present invention is a system for the comminution of passivating layers on particles to facilitate particle digestion. A vessel comprises a lower portion and an upper portion. The lower portion has an inner surface with an increasing cross sectional area in the upward direction. The upper portion is in fluid communication with the lower portion. The upper portion has an inner surface with a substantially constant cross sectional area. A focused ultrasonic source is positioned so as to sonicate material in the lower portion. At least one fluid inlet is so arranged and constructed relative to the lower portion to introduce fluid into a lower section of the lower portion in a manner so as to cause helical, upward circulation of any particles in the lower portion. A flow re-direction mechanism is positioned in the upper portion so as to stop the helical, upward circulation of the particles and to convert the circulation to an upward, substantially non-circular flow. Thus, the velocity of the particles is reduced, allowing the particles either to fall back down to the lower portion, or to continue upward in the upper portion in accordance with their size. At least one outlet is arranged and constructed relative to the lower portion for providing an exit of the fluid and particles less than a desired threshold size. A particle outlet is provided for adding particles to the vessel.

6 Claims, 1 Drawing Sheet

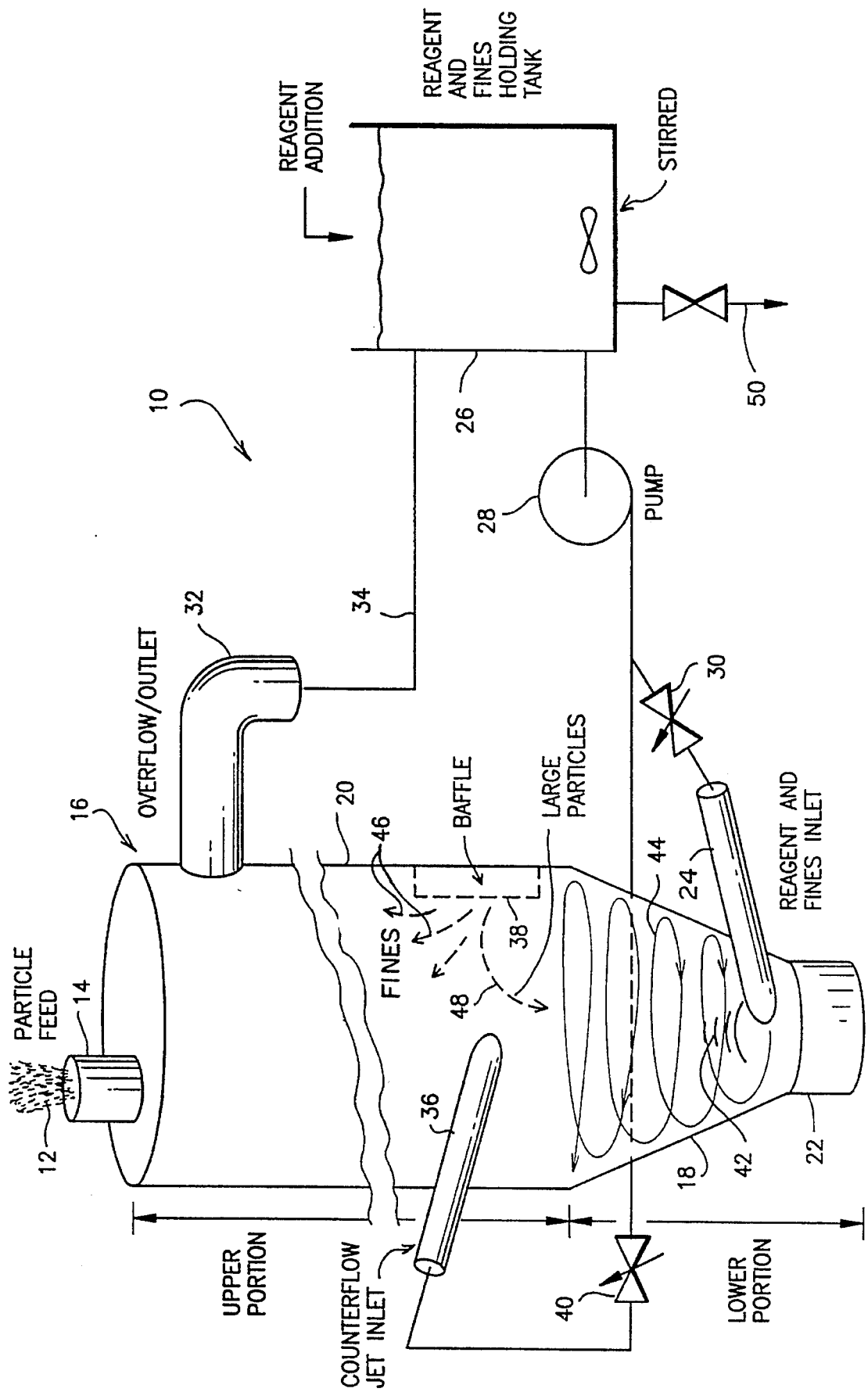

APPARATUS FOR SUSPENSION OF PARTICLES IN AN ULTRASONIC FIELD

BACKGROUND OF THE INVENTION

1. Field of the Invention

This invention relates to digestion with chemical systems which form passivating layers, and more particularly to the removal of passivating layers by a system in which differential duty cycles of particle residence within an ultrasonic field is based upon particle size.

2. Description of the Related Art

For the dissolution and digestion of various silicate and other mineral samples and of glasses for ore processing and for other uses where it is necessary to solubilize the material particles of various sizes, digestion can be expedited if the duty cycle of the particle is a function of the particle size. In other words, larger particles spend more time in the ultrasonic field. If all the material is kept in the ultrasonic digester, the smaller particles which can undergo reasonable passive digestion outside of the apparatus limit the amount of larger particles that can reside in the ultrasonic field. Light particles can be recirculated outside of the circulation vessel with varying duty cycles with reasonable digestion rates. However, large particles which must also be digested should spend more time in the ultrasonic field.

U.S. Pat. No. 5,059,309, issued to C. E. Jordan, discloses an ultrasonic flotation unit which separates material based on their hydrophobic or hydrophilic properties. Particles with no differential properties in this respect will not benefit from this type of flotation. Furthermore, the Jordan system is not applicable to homogenous types of materials which cannot be separated into fractions which float or sink.

U.S. Pat. No. 3,255,999, issued to D. Weston, discloses an apparatus which facilitates reactions with particulate matter. The apparatus is a one pass device with all particles entering an inlet and exiting through an outlet with no effort for internal recirculation or particle segregation. The apparatus injects reagents directly into the mixing zone.

U.S. Pat. No. 4,498,819, issued to A. A. El-Saie, discloses an apparatus for mixing multiple fluid streams for a control output density. It comprises a vessel with a lower conic section and a cylindrical upper section with tangential and axial inlets which provide different fluid streams. Mixing occurs as the fluids flow in a spiral in a direction of decreasing diameter through the cone and out the bottom. The El-Saie device does not segregate particles in accordance with their size.

SUMMARY OF THE INVENTION

The present invention is a system for the comminution of passivating layers on particles to facilitate particle digestion. A vessel comprises a lower portion and an upper portion. The lower portion has an inner surface with an increasing cross sectional area in the upward direction. The upper portion is in fluid communication with the lower portion. The upper portion has an inner surface with a substantially constant cross sectional area. A focused ultrasonic source is positioned so as to sonicate material in the lower portion. At least one fluid inlet is so arranged and constructed relative to the lower portion to introduce fluid into a lower section of the lower portion in a manner so as to cause helical, upward circulation of any particles in the lower portion. A flow re-direction mechanism is positioned in the upper portion so as to stop the helical, upward circulation of the particles and to convert the circulation to an upward, substantially non-circular flow. Thus, the velocity of the particles is reduced, allowing the particles either to fall back down to the lower portion, or to continue upward in the upper portion in accordance with their size. At least one outlet is arranged and constructed relative to the vessel portion for providing an exit of the fluid and particles less than a desired threshold size. A particle inlet is provided for adding particles to the vessel.

The present invention solves the problem of consolidation of the charge at the bottom of the mixing vessel by the ultrasonic field by re-circulating the material. This re-circulation is accomplished without the aid of a mechanical agitator which could be eroded by the ultrasonic energy in the particles. The ultrasonic field is focused so that the high energy zone is away from the walls or any mechanical component.

BRIEF DESCRIPTION OF THE DRAWINGS

The sole FIGURE is a schematic diagram of the system, for the comminution of particles by removal of passivating layers, of the present invention.

DETAILED DESCRIPTION OF THE PREFERRED EMBODIMENT

Referring now to the drawing and the characters of reference marked thereon, FIG. 1 illustrates the system of the present invention, designated generally as 10. Particles of feed 12 are introduced through a particle inlet 14 of a vessel, designated generally as 16. Vessel 16 comprises a lower portion 18 with an inner surface, having an increasing cross sectional area in the upward direction. Preferably, the lower portion 18 has an inner, conical surface. An upper portion 20 of vessel 16 is in fluid communication with the lower portion 18. The upper portion 20 has an inner surface with a substantially constant cross sectional area.

A focused ultrasonic source 22 is positioned relative to the vessel 16 so as to sonicate material in the lower portion 18. The ultrasonic source 22 may comprise, for example, various ceramic barium titanate transducers. The source 22 is preferably positioned at the bottom of the lower portion 18. What is desired is a zone of high density ultrasonic energy. At least one fluid inlet 24 is arranged and constructed relative to the lower portion 18 to introduce fluid into a lower section of the lower portion 18 in a manner so as to cause helical, upward circulation of any particles adjacent to the inner surface of the lower portion 18. Inlet 24 provides a tangential jet of fluid flow which initiates the helical upward motion along the inner surface of lower portion 18. An external source 26 of digestion fluid is pumped via pump 28 through flow control device (or valve) 30 via inlet 24 into vessel 16 until it is filled to the overflow/outlet 32. Outlet 32 is connected by conduit 34 to the reservoir or source 26. Flow redirection means is/are positioned in the upper portion 20 so as to stop the helical, upward circulation of the particles and to convert the circulation to an upward, substantially non-circular flow. Such flow redirection means may comprise a counterflow jet inlet 36. Alternately, or in conjunction therewith, an internal baffle or baffles 38 (shown in phantom lines) may be used to provide such a flow redirection. Counterflow jet inlets 36 may be, for example, be provided with digestion fluid from the pump 28 through valve 40.

The particles 12 that are introduced to the vessel 16 may comprise silicate systems such as lunar soils, basaltic soils, coal ash, industrial slag (containing significant metal values) and other industrial slag and natural materials not containing silica (e.g. scheelite) which can be dissolved in leachants (e.g. fluoroacids). The particles 12 generally range from about 1 micron to about 1,000 microns in diameter.

Particles 12 are introduced into the digestion fluid bath in the vessel 16 at temperatures generally less than 110° C. The initial digestion rate is rapid; however, it decays within about 15 minutes as passivating layers are formed. Digestion fluid introduced into vessel 16 through jets 24 and 36 initiate and then terminate the helical flow condition in lower portion 18. Particles 12 in the digestion fluid which have sunk to the bottom lower portion 18 are entrained in the jet issuing from inlet 24 and are pulled up and away from the zone 42 of ultrasonic energy. The entrained particles 12 flow up and around the inner surface of lower portion 18 as shown by curved line 44. As the particles 12 flow upward in lower portion 18, their velocity decreases due to the increasing diameter of lower portion 18. Once the particles 12 reach the cylindrical, upper portion 20, the flow issuing from jet 36 counters the helical flow 44. Particles are removed from the wall of portion 20. Liquid flow continues generally upward en-training particles 46, which are not heavy enough to fall back into lower portion 18. Particles 46 continue with the upward flow and out the outlet 32 through conduit 34 to the storage reservoir 26.

Particles 48 are large enough to fall back into the lower portion 18 and back into the ultrasonic field 42 to repeat the helical motion. Particles 48 continue in this manner until they are reduced in size to a point where they will flow up and out the overflow.

In the steady state, particles 12 will be introduced through the inlet 14 and digested material is removed external to the apparatus for further processing, as shown by numeral designation 50.

Jet 36 may work in conjunction with or instead or be replaced by a baffle(s) 38.

With the known relation between the density of the digesting fluid and digesting particles, the flow rate and cross sectional area of the upper portion are so selected that those particles which are essentially completely digested are entrained and flow out the overflow 32.

In an exemplary system, the digestion fluid bath comprises mixed fluoroacids and water. Typical mixed fluoroacids may comprise fluorotitanic, fluorosilicic, and hydrofluoric acids and demineralized water. A preferred digestion fluid bath comprises a mixture of approximately ⅓ water, approximately ⅓ 49% hydrofluoric acid and approximately 60% fluorotitanic acid. The concentration of hydrofluoric acid and protons are varied as necessary to control the free-fluoride content to separate alkaline earth species from the remainder of the digested material via differential solubility.

At the initiation of digestion, the passivating layers do not exist and digestion proceeds at an expeditious rate which would allow for rapid digestion. However, the digestion rate decays rapidly due to the formation of passivating layers which build up fluoride digestion products. For example, if coal fly ash is being digested by fluoroacid, the passivating layers would comprise alkaline earth fluorides such as calcium fluoride and magnesium fluoride. The acid must diffuse through this layer in order to reach undigested material in the particle 12. The progressive buildup reduces the rate of digestion by increasing the diffusion time. A balance must be struck in the acceptability of the diffusion rate and the removal the passivating layers. What is desired as an effective diffusion rate which may be less than what is available initially but must be much better than that which would be available if the passivating layers were allowed to form unhindered.

This balance is achieved by periodically conveying the particles 12 through the ultrasonic beam 46 to remove portions of the passivating layers, thereby exposing fresh surfaces of the particles 12 to the digestion fluid bath. Subsequently, the diffusion barriers begin to reform the freshly exposed surfaces. The fresh surfaces are digested at the initial digestion rate and begin the build up of the diffusion barriers. The balance is struck by recycling the particle 12 into the ultrasonic beam 42. The passivating layers or portions thereof are removed. Then the particle 12 is removed from the ultrasonic beam by helical motion 44 and allowed to digest. The particles 12 are periodically recycled into the beam 42, removing fractions of the passivating layers. The particles get progressively smaller until they overflow into outlet 32.

The ultrasound is primarily used to remove the passivating layers, only, and not to reduce the undigested portions of particle 12 in size.

Leachants which may be present in the digestion fluid bath may include, but are not limited to sulfuric acid, sulfurous acid, phosphoric acid and its dehydration products, the various $HXO_n$ where $0 \leq n \leq 4$ and X=Cl, Br or I, hydrofluoric acid, fluoroacids such as $H_2SiF_6$, $H_2TiF_6$, $H_2ZrF_6$, $HSbF_6$, $HPF_6$, $HAsF_6$, $H_3AlF_6$, $H_3FeF_6$, etc., nitric acid, organic acids such as acetic, oxalic, or citric, or those with higher carbon numbers, water or non-aqueous solutions of the these acids or their mixtures; or caustic, soda ash, potash, etc., their water solutions or mixtures or ammonia or amines.

Other leachants may include cyanide, EDTA, or other chelating agents.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A system for the comminution of passivating layers on particles to facilitate particle digestion, comprising:
   a) a vessel, comprising:
      i) a lower portion having an inner surface with an increasing cross sectional area in the upward direction; and
      ii) an upper portion being in fluid communication with said lower portion, said upper portion having an inner surface with a substantially constant cross sectional area;
   b) a focused ultrasonic source positioned so as to sonicate material in said lower portion, said focused ultrasonic source providing sufficient energy to effect comminution of passivating layers on particles in said lower portion;

c) at least one fluid inlet so arranged and constructed relative to said lower portion to introduce fluid into a lower section of said lower portion in a tangential manner so as to cause helical, upward circulation of any particles in said lower portion;

d) flow re-direction means positioned in said upper portion so as to stop said helical, upward circulation of said particles and to convert said circulation to an upward, substantially non-circular flow, thereby reducing the velocity of said particles and allowing said particles to either fall back down to said lower portion or to continue upward in said upper portion in accordance with their size;

e) at least one outlet so arranged and constructed relative to said vessel for providing an exit flow of said fluid and particles less than a desired threshold size; and, f) a particle inlet for adding particles to said vessel.

2. The system of claim 1, wherein said lower portion has a substantially conical inner surface.

3. The system of claim 1, wherein said upper portion has a substantially cylindrical inner surface.

4. The system of claim 1, wherein said flow re-direction means comprises at least one baffle.

5. The system of claim 1, wherein said flow re-direction means comprises a fluid jet directed to oppose said helical, upward circulation of particles.

6. The system of claim 1 further comprising external re-circulation means in fluid communication with outlet and said fluid inlet for conveying fluid and particles from said outlet back to said at least one fluid inlet.

* * * * *